United States Patent
Zhang et al.

(10) Patent No.: US 10,187,225 B2
(45) Date of Patent: Jan. 22, 2019

(54) SYSTEM AND METHOD TO ENABLE SECONDARY TRANSMISSION IN THE PRESENCE OF AN ACTIVE PRIMARY TRANSMISSION

(71) Applicant: William Marsh Rice University, Houston, TX (US)

(72) Inventors: Xu Zhang, Shenzhen (CN); Edward W. Knightly, Houston, TX (US)

(73) Assignee: William Marsh Rice University, Houston, TX (US)

( * ) Notice: Subject to any disclaimer, the term of this patent is extended or adjusted under 35 U.S.C. 154(b) by 134 days.

(21) Appl. No.: 15/228,776

(22) Filed: Aug. 4, 2016

(65) Prior Publication Data

US 2017/0041162 A1 Feb. 9, 2017

Related U.S. Application Data

(60) Provisional application No. 62/202,378, filed on Aug. 7, 2015.

(51) Int. Cl.
*H04L 25/02* (2006.01)
*H04B 7/06* (2006.01)

(52) U.S. Cl.
CPC ....... *H04L 25/0226* (2013.01); *H04B 7/0617* (2013.01); *H04B 7/0619* (2013.01); *H04B 7/0695* (2013.01); *H04L 25/0202* (2013.01)

(58) Field of Classification Search
CPC .. H04B 7/0617; H04B 7/0626; H04B 7/0417; H04B 7/0634; H04W 16/28
See application file for complete search history.

(56) References Cited

U.S. PATENT DOCUMENTS

| 2014/0029686 A1* | 1/2014 | Aldana | H01Q 3/30 375/267 |
| 2015/0117329 A1* | 4/2015 | Avudainayagam | H04B 3/54 370/329 |
| 2017/0180105 A1* | 6/2017 | Clegg | H04L 5/0073 |
| 2017/0214439 A1* | 7/2017 | Shtrom | H04B 7/0421 |

OTHER PUBLICATIONS

N. Anand, R. Guerra, and E. Knightly. "The Case for UHF-Band MU-MIMO." In Proc. of ACM MobiCom'14, Sep. 7-11, 2014, 12 pages.

Advance Television Systems Committee. "ATSC Digital Television Standard—Part 2: RF/Transmission System Characteristics." Dec. 15, 2011, 28 pages.

(Continued)

*Primary Examiner* — Jung H Park
(74) *Attorney, Agent, or Firm* — Osha Liang LLP (57) ABSTRACT

A method includes generating, by a wireless device, a sounding packet. The method includes sending, by the wireless device, copies of the sounding packet using a beam former and an antenna array to a second wireless device. Each copy of the copies of the sounding packet is sent using different beam weights. The method includes, in response to sending the copies of the sounding packet, obtaining, by the wireless device, a first correction beam weight and a second correction beam weight from the second wireless device and sending, by the wireless device, data to the second wireless device using the first correction beam weight and the second correction beam weight.

20 Claims, 9 Drawing Sheets

(56) References Cited

OTHER PUBLICATIONS

P. Bahl, R. Chandra, T. Moscibroda, R. Murty, and M. Welsh. "White Space Networking with Wi-Fi Like Connectivity." In Proc. of ACM SIGCOMM'09, Aug. 17-21, 2009, 12 pages.

L. Bedogni, A. Achtzehn, M. Petrova, and P. Mähönen. "Smart Meters with TV Gray Spaces Connectivity: A Feasibility Study for Two Reference Network Topologies." In Proc. of IEEE SECON, 2014, 9 pages.

L. Ching-Ju, S. Gollakota, and D. Katabi. "Random Access Heterogeneous MIMO Networks." In Proc. of ACM SIGCOMM'11, Aug. 15-19, 2011,12 pages.

B. Ellingsaeter, H. Bezabih, J. Noll, and T. Maseng. "Using TV Receiver Information to Increase Cognitive White Space Spectrum." In Proc. of IEEE DYSPAN, 2012, 11 pages.

Federal Communications Commission. "Second Report and Order and Memorandum Opinion and Order; In the Matter of Unlicensed Operation in the TV Broadcast Bands; Additional Spectrum for Unlicensed Devices below 900 MHz and in the 3 GHz Band." Nov. 14, 2008, 130 pages.

A. Flores, R. Guerra, E. Knightly, P. Ecclesine, and S. Pandey. "IEEE 802.11af: A Standard for TV White Space Spectrum Sharing." IEEE Communications Magazine, 51(10): 92-100, Oct. 2013, 9 pages.

S. Gollakota, F. Adib, D. Katabi, and S. Seshan. "Clearing the RF Smog: Making 802.11n Robust to Cross-Technology Interference." In Proc. of ACM SIGCOMM'11, Aug. 15-19, 2011, 12 pages.

S. Gollakota, S. Perli, and D. Katabi. "Interference Alignment and Cancellation". In Proc. of ACM SIGCOMM'09, Aug. 17-21, 2009, 12 pages.

K. Harrison, S. Mishra, and A. Sahai. How Much White-Space Capacity Is There? In Proc. of IEEE DYSPAN, 2010, 10 pages.

International Telecommunication Union. "ITU-T Recommendation G.975.1.; Series G: Transmission Systems and Media, Digital Systems and Networks; Digital Section and digital line system—Optical fibre submarine cable systems; Forward error correction for high bit-rate DWDM submarine systems." <http://www.itu.int/rec/T-REC-G.975.1>, 2004, 58 pages.

H. Karimi. "A Framework for Calculation of TV White Space Availability Subject to the Protection of DTT and PMSE". In Proc. of IEEE PIMRC, 2013, 6 pages.

M. Laner, P. Svoboda, P. Romirer-Maierhofer, N. Nikaein, F. Ricciato, and M. Rupp. "A Comparison between One-Way Delays in Operating HSPA and LTE Networks". In Proc. of IEEE WiOpt, May 14-18, 2012, 7 pages.

D. Lekomtcev and R. Mar_s_alek. "Comparison of 802.11 of and 802.22 Standards—Physical Layer and Cognitive Functionality." Elektro Revue, vol. 3, No. 2, Jun. 2012, 7 pages.

R. Murty, R. Chandra, T. Moscibroda, and P. Bahl. "Senseless: A Database-Driven White Spaces Network. In Proc. of IEEE Transactions on Mobile Computing." vol. 11, No. 2, DYSPAN, Nov. 10, 2011, 15 pages.

Y. Noam and A. Goldsmith. "Blind Null-Space Learning for MIMO Underlay Cognitive Radio with Primary User Interference Adaptation." IEEE Transactions on Wireless Communications, vol. 12, No. 4. Apr. 2013, 1722-1734, 2013, 13 pages.

K. Tan, H. Liu, J. Fang, W. Wang, J. Zhang, M. Chen, and G. Voelker. "SAM: Enabling Practical Spatial Multiple Access in Wireless LAN." In Proc. of ACM MobiCom'09, Sep. 20-25, 2009, Beijin, China, 12 pages.

M. Wylie-Green and T. Svensson. "Throughput, Capacity, Handover and Latency Performance in a 3GPP LTE FDD Field Trial." In Proc. of IEEE GLOBECOM, 2010, 6 pages.

Y. Yan, P. Yang, X. Li, Y. Tao, L. Zhang, and L. You. "ZIMO: Building Cross-technology MIMO to Harmonize ZigBee Smog with WiFi Flash Without Intervention." In Proc. of ACM MobiCom'13, Sep. 30-Oct. 4, 2013, 12 pages.

X. Ying, J. Zhang, L. Yan, G. Zhang, M. Chen, and R. Chandra. "Exploring Indoor White Spaces in Metropolises." In Proc. of ACM MobiCom' 13, Sep. 30-Oct. 4, 2013, 12 pages.

H. Yu, O. Bejarano, and L. Zhong. "Combating Inter-cell Interference in 802.11ac-based Multi-user MIMO Networks." . In Proc. of ACM MobiCom'14, Sep. 7-11, 2014, 12 pages.

Y. Yuan, P. Bahl, R. Chandra, P. A. Chou, I. Ferrell, T. Moscibroda, S. Narlanka, and Y. Wu. "KNOWS: Kognitiv Networking Over White Spaces." In Proc. of IEEE DYSPAN, 2007, Microsoft Research, 12 pages.

T. Zhang, N. Leng, and S. Banerjee. "A Vehicle-based Measurement Framework for Enhancing Whitespace Spectrum Databases." In Proc. of ACM MobiCom'14, Sep. 7-11, 2014, 12 pages.

* cited by examiner

SYSTEM AND METHOD TO ENABLE SECONDARY TRANSMISSION IN THE PRESENCE OF AN ACTIVE PRIMARY TRANSMISSION

STATEMENT REGARDING FEDERALLY SPONSORED RESEARCH OR DEVELOPMENT

The invention was made with government support under Grant Number CNS-1444056 awarded by the National Science Foundation. The invention was made with government support under Grant Number CNS-1126478 awarded by the National Science Foundation. The invention was made with government support under Grant Number CNS-1012831 awarded by the National Science Foundation. The government has certain rights in the invention.

BACKGROUND

Networks may enable the transmission of data between multiple devices. Links between the devices may be either wired or wireless. Data that is transmitted via wired links may also be transmitted via wireless links to ensure that all devices of the network are able to communicate with one another.

SUMMARY

In one aspect, a wireless device in accordance with embodiments of the invention includes a transceiver. The transceiver includes an antenna array that transmits to a second wireless device and a beam former that modifies a radiation pattern of the antenna array based on beam weights. The wireless device also includes a channel estimator that generates a sounding packet; sends copies of the sounding packet using the beam former and the antenna array to the second wireless device, wherein each copy of the copies of the sounding packet is sent using different beam weights; and, in response to sending the copies of the sounding packet, obtains, from the second wireless device, a first correction beam weight and a second correction beam weight; and sends data to the second wireless device using the first correction beam weight and the second correction beam weight.

In one aspect, a wireless device in accordance with embodiments of the invention includes a transceiver. The transceiver includes an antenna array that receives transmissions from a second wireless device. The wireless device also includes a channel estimator that obtains copies of a sounding packet from the second wireless device, each copy of the sounding packet includes interference from a broadcast transmission; obtains a first correction beam weight and a second correction beam weight using the copies of the sounding packet; sends, to the second wireless device, the first correction beam weight and the second correction beam weight; and, in response to sending the first correction beam weight and the second correction beam weight, obtains a data transmission including interference from the broadcast transmission; removes the interference from the data transmission; and decodes the data from the data transmission after removing the interference.

In one aspect, a method in accordance with embodiments of the invention includes generating, by a wireless device, a sounding packet; sending, by the wireless device, copies of the sounding packet using a beam former and an antenna array to a second wireless device, each copy of the copies of the sounding packet is sent using different beam weights; and, in response to sending the copies of the sounding packet, obtaining, by the wireless device, a first correction beam weight and a second correction beam weight from the second wireless device; and sending, by the wireless device, data to the second wireless device using the first correction beam weight and the second correction beam weight.

In one aspect, a method in accordance with embodiments of the invention includes obtaining, by a wireless device, copies of a sounding packet from a second wireless device, each copy of the sounding packet includes interference from a broadcast transmission; obtaining, by the wireless device, a first correction beam weight and a second correction beam weight using the copies of the sounding packet; sending, by the wireless device, the first correction beam weight and the second correction beam weight to the second wireless device; and, in response to sending the first correction beam weight and the second correction beam weight, obtaining, by the wireless device, a data transmission that includes interference from the broadcast transmission; removing, by the wireless device, the interference from the data transmission; and decoding, by the wireless device, the data from the data transmission after removing the interference.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to methods and systems for network communications. The network may include any number of devices that are connected to the network and spatially separated from each other. The network may include wired links, e.g., fiber optic links, networking cables, etc., and wireless links that enable the devices to transmit data between the devices.

Bandwidth may be allocated to the wireless links based on the spatial location of the wireless links and the location of any active receivers near the wireless links. The bandwidth of the wireless links may be restricted so that the wireless links are not operating in a band where the active receivers are operating.

Wireless links may employ multiple antenna interference reduction methods to reduce interference caused by other wireless links such as, for example, broadcast communications or point to point communications.

In one or more embodiments of the invention, multiple wireless links may be operating in the same spatial location and may be using the same spectral band. A system in accordance with embodiment of the invention may include a spectrum allocation database controller. The spectrum allocation database controller may enable each of the multiple wireless links to operate without interference with other wireless links while maximizing the available communication bandwidth of each wireless link.

In one or more embodiments of the invention, the spectrum allocation database controller includes information that specifies the location and/or spectral band utilized by each of the wireless links. When information is to be transmitted via one of the wireless links, the spectrum allocation database controller is consulted and a spectral band is allocated to the wireless link that maximizes the data transmission rate of the wireless link while preventing interference with other wireless links.

In one or more embodiments of the invention, a first portion of the wireless links are broadcast links, e.g., over the air television stations. The first portion of the wireless links may include a broadcast transmitter and a broadcast receiver. In one or more embodiments of the invention, the broadcast receiver reports its spatial location and active reception band to the spectrum allocation database controller while actively receiving signals. The broadcast transmitter may transmit signals over a broadcast area. As used herein, a broadcast area refers to a spatial area where signals are wirelessly transmitted by a broadcast transmitter. In some embodiments of the invention, the first portion of the wireless links are point to point communication links, e.g., a wireless network adapter and a wireless router.

In one or more embodiments of the invention, a second portion of the wireless links are point to point communication links, e.g., a wireless network adapter and a wireless router. A wireless link of the second portion of the wireless links may include a secondary transmitting transceiver and a secondary receiving transceiver. The secondary transmitting transceiver may be connected to the network via a wired connection. Thus, the transmitting transceiver may facilitate the transmission of data between entities connected to the network and the secondary receiving transceiver.

In one or more embodiments of the invention, the secondary transmitting transceiver and the secondary receiving transceiver each include an antenna array. The antenna arrays may be used to modulate channel characteristics between the secondary transmitting transceiver and the secondary receiving transceiver. Modulating the channel characteristics may reduce interference received from a broadcast transmitter operating near the secondary transmitting transceiver and the secondary receiving transceiver.

Figure 1:
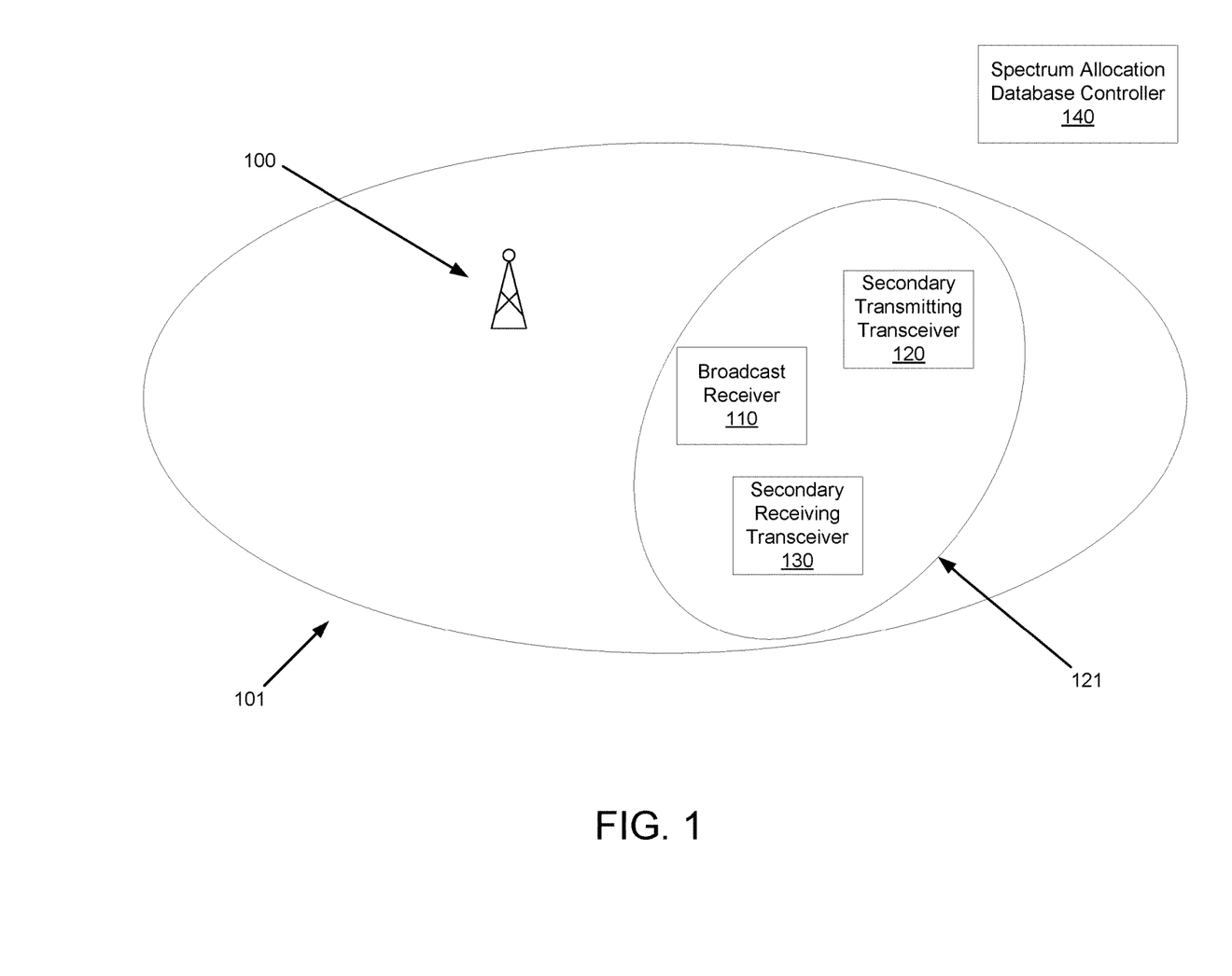
FIG. 1 shows a diagram of a network in accordance with one or more embodiments of the invention.

FIG. 1 shows a network in accordance with one or more embodiments of the invention. The network shown in FIG. 1 includes a first wireless link and a second wireless link. While the network shown in FIG. 1 includes only two wireless links, a network may include any number of wireless links without departing from the invention.

The first wireless link includes a broadcast transmitter (100) and a broadcast receiver (110). The broadcast transmitter (100) transmits signals that may be received by any receiver in the broadcast area (101). While the first wireless link shown in FIG. 1 includes only a single transmitter and a single receiver, the first wireless link may include any number of transmitters and receivers without departing from the invention.

The broadcast transmitter (100) may a physical device for wireless transmission of signals. The broadcast transmitter (100) may include circuitry. The circuitry may include filters, amplifiers, modulators, digital signal processors, application integrated circuits, general processors, programmable gate arrays, power converters, power supplies, antennas, antenna arrays, and/or other circuit elements. The broadcast transmitter (100) may be, for example, a television broadcast transmitter. The broadcast transmitter (100) may be other types of transmitters without departing from the invention.

Figure 3:
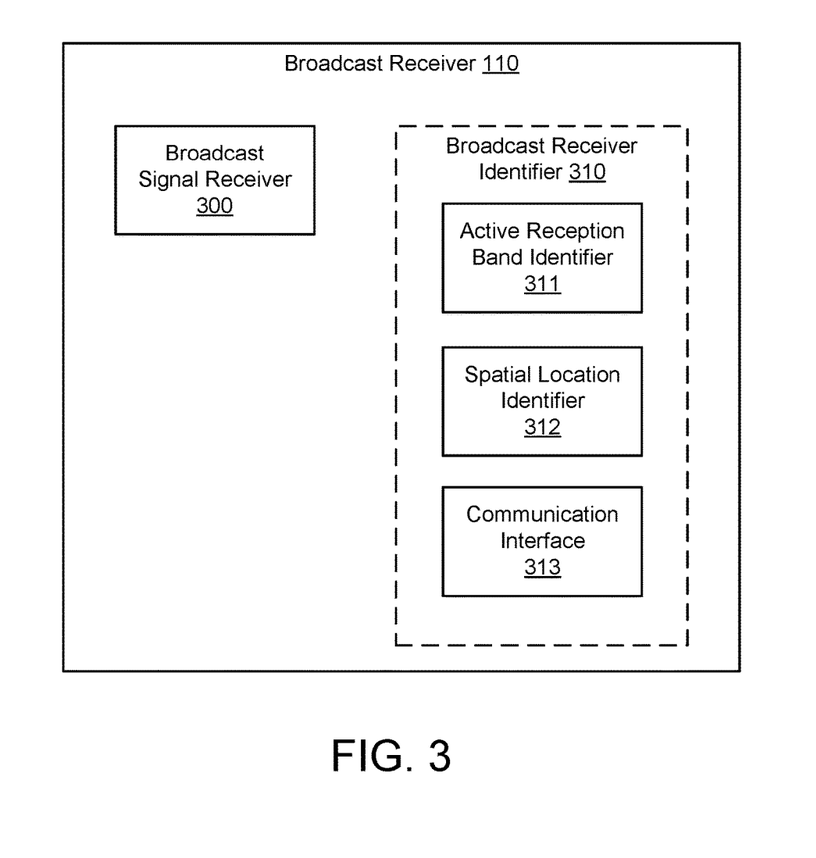
FIG. 3 shows a diagram of a broadcast receiver in accordance with one or more embodiments of the invention.

The broadcast receiver (110) may be a physical device that receives wireless signals and notifies the spectrum allocation database of it spatial location and active reception band. FIG. 3 shows a broadcast receiver (100) in accordance with embodiments of the invention. The broadcast receiver (110) may include circuitry. The circuitry may include filters, amplifiers, modulators, digital signal processors, application integrated circuits, general processors, programmable gate arrays, power converters, power supplies, antennas, antenna arrays, and/or other circuit elements. For example, the broadcast signal receiver (300) may be/include a receiver chain.

The broadcast receiver (110) may include a broadcast signal receiver (300) that receives wireless signals and a broadcast receiver identifier (310) that notifies the spectrum allocation database of the location and active reception band. Each of the aforementioned components is described below.

The broadcast receiver (300) may receive signals from the broadcast transmitter (See, e.g., FIG. 1, 100). The broadcast receiver (300) may demodulate the received signals to obtain data transmitted via the signals.

The broadcast receiver identifier (310) may continuously monitor the reception of signals the broadcast receiver (110) and report an active reception band and/or a spatial location of the broadcast receiver (110) when an active reception band is present. The broadcast receiver (310) includes an active reception band identifier (311), a spatial location identifier (312), and a communication interface (313). Each of the aforementioned components is described below.

The active reception band identifier (311) identifies an active reception band. As used herein, an active reception band is a spectral band to which the broadcast signal receiver (300) is tuned to receive signals and a user of the broadcast receiver (110) is actively using data received via the spectral band. The active reception band identifier (311) may determine the active reception band by monitoring tuning of the broadcast signal receiver and a power state of the broadcast receiver. For example, the active reception band identifier (311) may monitor the power state of the broadcast receiver to determine whether the received signals are being actively received, e.g., displayed, retransmitted, etc., or are not being actively received, e.g., not view, utilized, or otherwise acted on by a user of the broadcast receiver. The active reception band identifier (311) may identify an active reception band by other methods without departing from the invention.

When an active reception band is identified by the active reception band identifier (311), the active reception band may be reported to the spectrum allocation database controller via the communication interface (313).

The spatial location identifier (312) may be a physical device that identifies a spatial location of the broadcast receiver (110). The spatial location identifier (312) may a global position system, a mapping system, a geographic information system, or other system for identifying a spatial location.

When an active reception band is identified by the active reception band identifier (311), the spatial location identifier (312) may report the spatial location of the broadcast receiver (110) to the spectrum allocation database controller via the communication interface (313).

The communication interface (313) may be a network interface that enables the broadcast receiver identifier (310) to communicate with the spectrum allocation database controller. The communication interface (313) may be, for example, a network adapter, an operable connection, or other type of communication link.

While the broadcast receiver identifier (310) is illustrated as a component of the broadcast receiver (110) in FIG. 3, the broadcast receiver identifier (310) may be a separate device without departing from the invention.

Additionally, while the broadcast receiver identifier (310) has been described as determining the active reception band of the broadcast receiver (110) directly, e.g., measuring a state of the broadcast signal receiver (300), the broadcast receiver identifier (310) may determine the active reception band of the broadcast receiver (110) indirectly without departing from the invention. For example, the broadcast receiver identifier (310) may monitor sound or light within an area disposed adjacent to the broadcast receiver (110) to infer a power state of the broadcast receiver (110). In another example, the broadcast receiver identifier (310) may monitor electromagnetic interference that is characteristic of a broadcast receiver (110) to infer an active reception band of the broadcast receiver (110).

Returning to FIG. 1, the second wireless link includes a secondary transmitting transceiver (120) and a secondary transmitting transceiver (130). The second wireless link may be a point to point wireless connection. The secondary transmitting transceiver (120) transmits signals that may be received by any receiver in a secondary transmission area (121). While the second wireless link shown in FIG. 1 includes only two transceivers, the second wireless link may include any number of transceivers without departing from the invention.

As seen in FIG. 1, the transmission areas (101, 121) of the first and second wireless links overlap each other and thereby may cause interference with each other. Embodiment of the invention may reduce and/or prevent interference between the wireless links.

Figure 4:
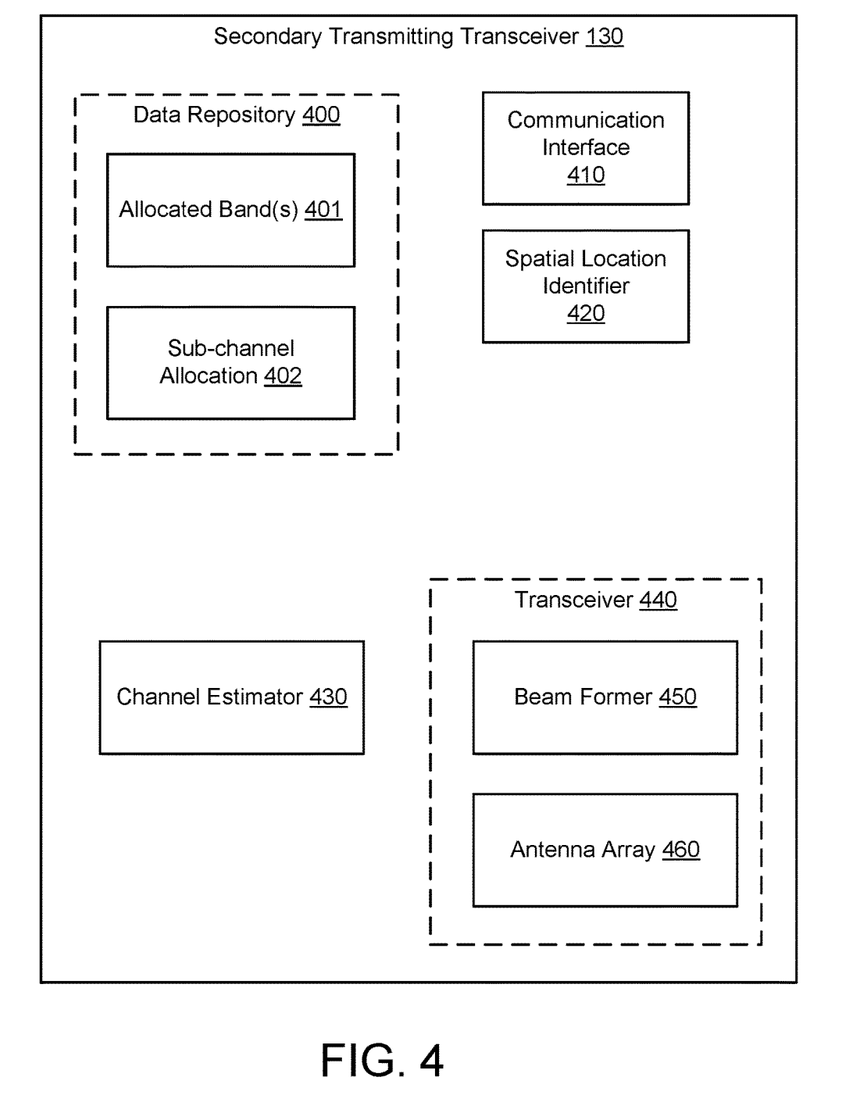
FIG. 4 shows a diagram of a secondary transmitting transceiver in accordance with one or more embodiments of the invention.

FIG. 4 shows a secondary transmitting transceiver (120) in accordance with embodiments of the invention. The secondary transmitting transceiver (120) may a physical device for wireless transmission of signals between the secondary transmitting transceiver (120) and the secondary receiving transceiver (130). The secondary transmitting transceiver (120) may include circuitry. The circuitry may include filters, amplifiers, modulators, digital signal processors, application integrated circuits, general processors, programmable gate arrays, power converters, power supplies, antennas, antenna arrays, and/or other circuit elements.

Figure 7:
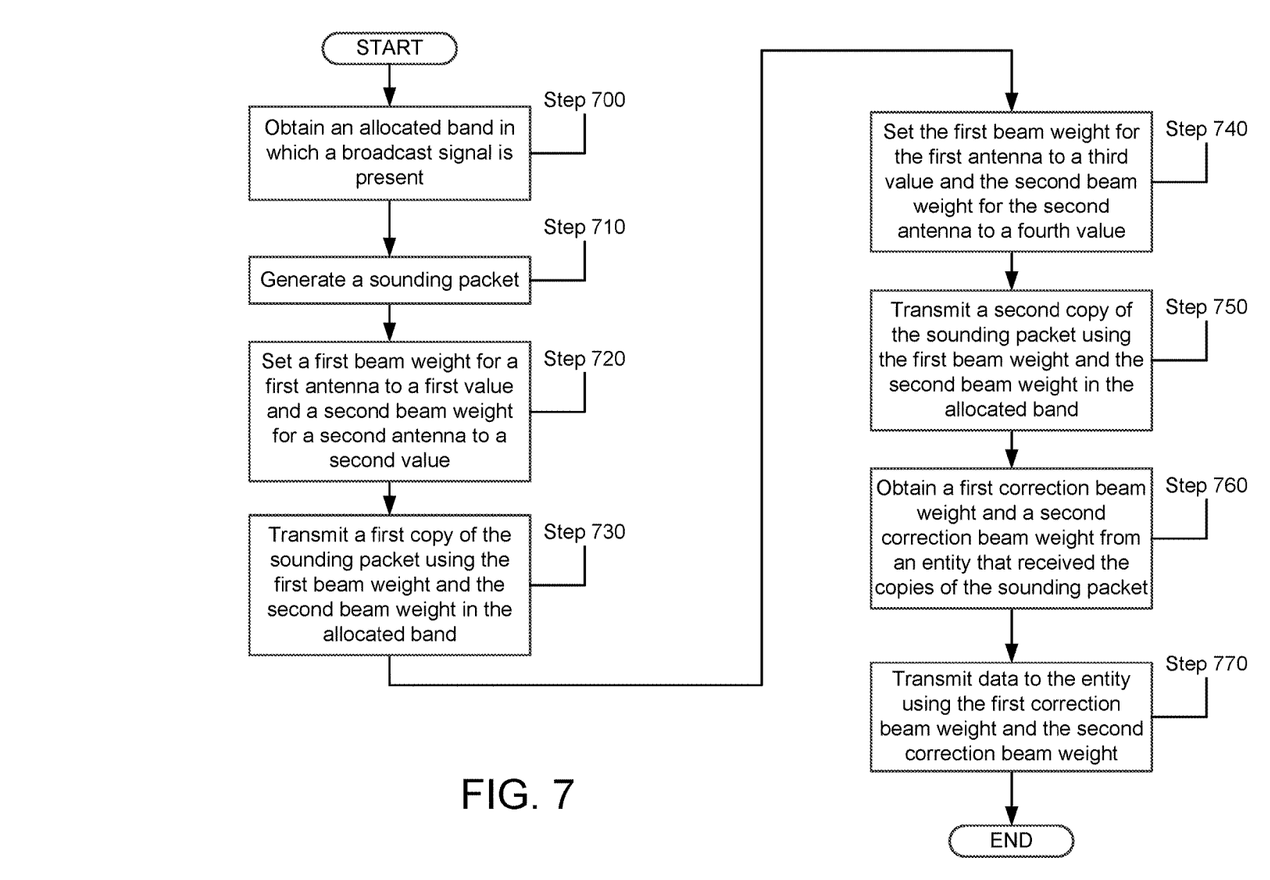
FIG. 7 shows a flowchart of a method of transmitting data in accordance with one or more embodiments of the invention.

Additionally, the secondary transmitting transceiver (120) may include instructions stored on a non-transitory computer readable media that when executed by the secondary transmitting transceiver (120) provide the functionality shown in FIG. 7.

The secondary transmitting transceiver (120) may include a data repository (400), a communication interface (410), a spatial location identifier (420), a channel estimator (430), and a transceiver (440). Each of the aforementioned components is described below.

The data repository (400) may be a computer readable storage medium (CRM). The CRM may be a hard drive, a network attached storage, a cloud storage, a solid state drive, persistent memory, transitory memory, or any other type of CRM for storage of information. The data repository (400) may store allocated bands (401) and sub-channel allocations (402). The allocated bands (401) may be spectral bands over which the transceiver (440) may transmit signals. The sub-channel allocations (402) may specify how the allocated band(s) (401) is/are divided into sub-channels.

The communication interface (410) may be an interface by which the secondary transmitting transceiver (120) communicates with the spectrum allocation database controller. The communication interface (410) may be, for example, a network adapter, an operable connection, or other type of communication link.

The spatial location identifier (420) may identify a spatial location of the secondary transmitting transceiver (120). The spatial location identifier (420) may a global position system, a mapping system, a geographic information system, or other system for identifying a spatial location.

The channel estimator (430) may estimate a condition of a wireless channel used to transmit data between the secondary transmitting transceiver (120) and the secondary receiving transceiver (130). The channel estimator may generate sounding packets based on predetermined sequences, transmit the sounding packets via the transceiver (440), and modify the operation of the transceiver (440) based on feedback received from the secondary receiving transceiver (130).

The transceiver (440) may be a wireless transceiver that sends and receives wireless signals. The transceiver (440) may modulate the signals to encode or decode data. The transceiver (440) may include a beam former (450) and an antenna array (460). Each of the aforementioned components is described below.

The beam former (450) may modify the amplitude and/or phase of signals sent to antennas of the antenna array (460). Modifying the amplitude and/or phase of the signals may alter the radiation pattern of the antenna array (460) and thereby modify the channel characteristics between the secondary transmitting transceiver (120) and the secondary receiving transceiver (130). The amplitude and/or phase of the signals may be set by the channel estimator (430).

The antenna array (460) may be an array of antennas. Each of the antennas may receive signals from the beam former (450) and transmit the signals. The antennas may be, for example, dipole antennas, monopole antennas, patch antennas, or planar inverted F antennas. Other types of antennas may be used without departing from the invention.

Figure 5:
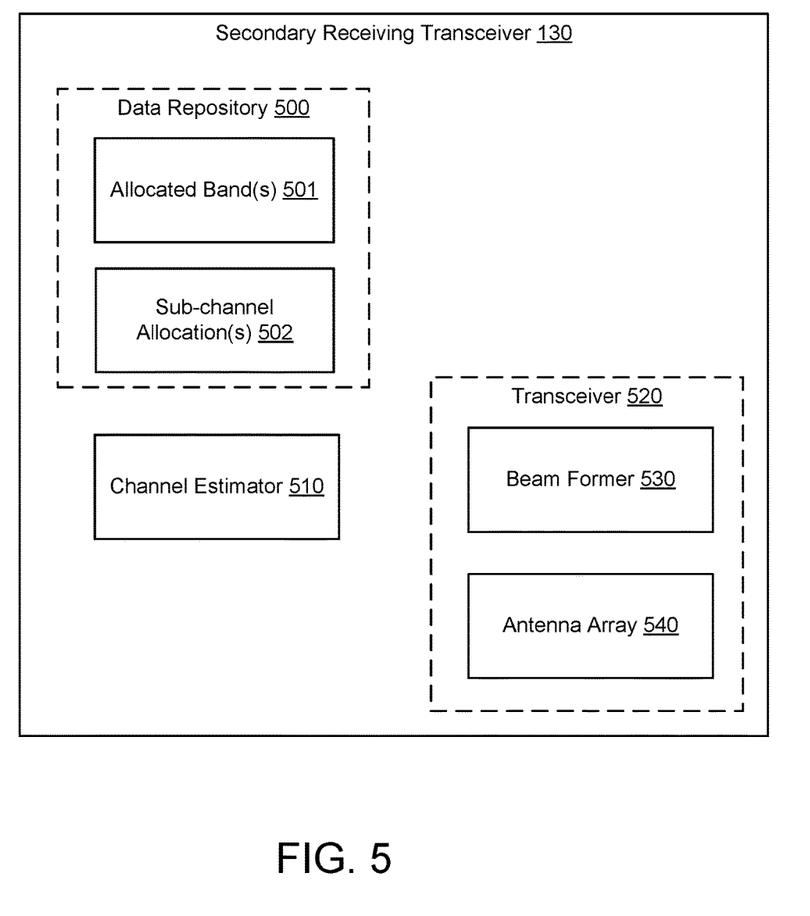
FIG. 5 shows a diagram of a secondary receiving transceiver in accordance with one or more embodiments of the invention.

Returning to FIG. 1, the second wireless link also includes a secondary receiving transceiver (130). FIG. 5 shows a secondary receiving transceiver (130) in accordance with embodiments of the invention. The secondary receiving transceiver (130) may be a physical device for wireless transmission of signals between the secondary transmitting transceiver (120) and the secondary receiving transceiver (130). The secondary receiving transceiver (130) may include circuitry. The circuitry may include filters, amplifiers, modulators, digital signal processors, application integrated circuits, general processors, programmable gate arrays, power converters, power supplies, antennas, antenna arrays, and/or other circuit elements.

Figure 8:
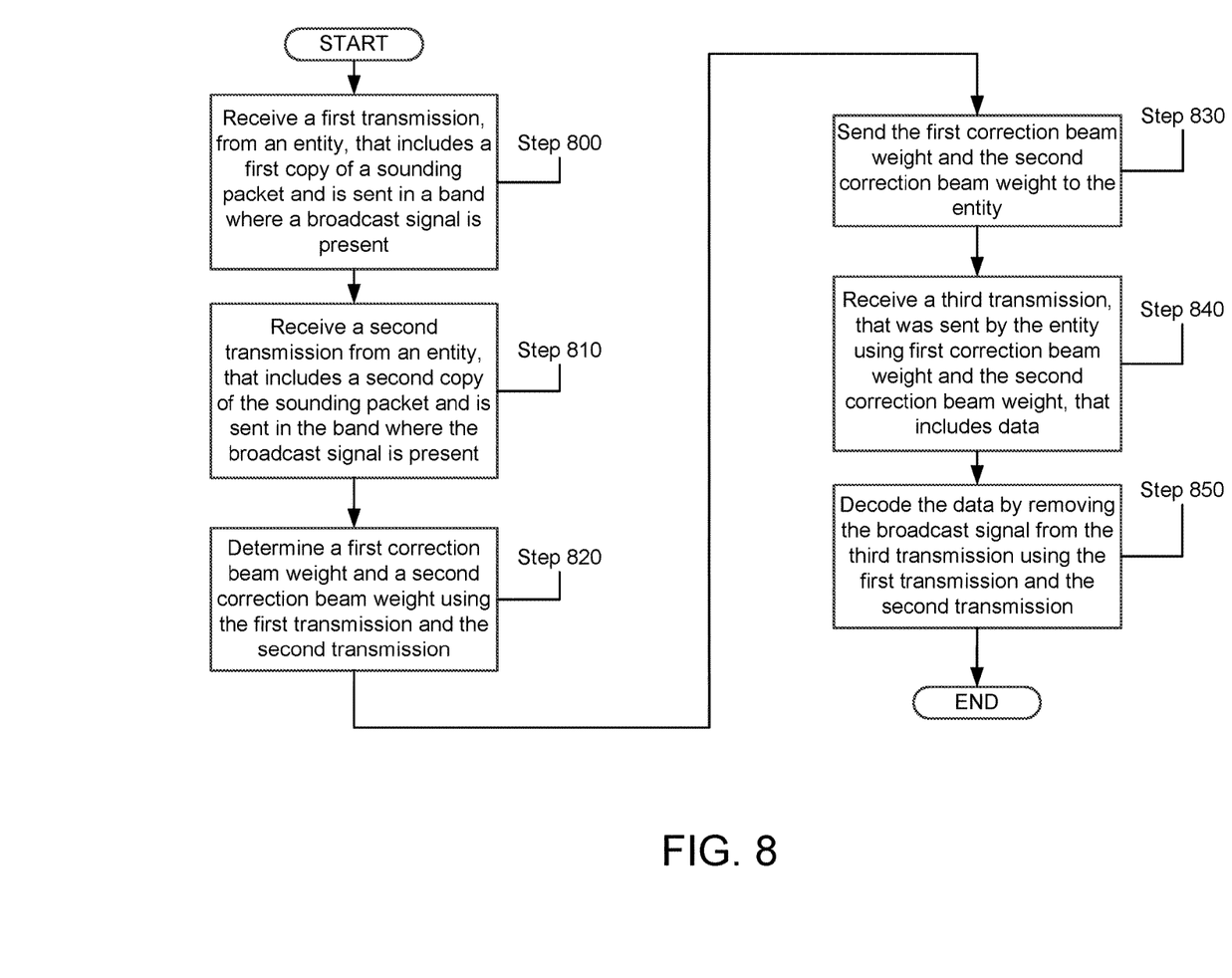
FIG. 8 shows a second flowchart of the method of transmitting data in accordance with one or more embodiments of the invention.

Additionally, the secondary receiving transceiver (130) may include instructions stored on a non-transitory computer readable media that when executed by the secondary receiving transceiver (130) provide the functionality shown in FIG. 8.

The secondary receiving transceiver (130) may include a data repository (500), a channel estimator (510), and a transceiver (520). Each of the aforementioned components is described below.

The data repository (500) may be a computer readable storage medium (CRM). The CRM may be a hard drive, a network attached storage, a cloud storage, a solid state drive, persistent memory, transitory memory, or any other type of CRM for storage of information. The data repository (500) may store allocated bands (501) and sub-channel allocation(s) (502). The allocated bands (501) may be spectral bands over which the transceiver (520) may transmit signals. The sub-channel allocations (502) may specify how the allocated band(s) (501) is/are divided into sub-channels. The allocated band(s) (501) and sub-channel allocation(s) (502) may be obtained by the secondary receiving transceiver (130) from the secondary transmitting transceiver (120). For example, the secondary transmitting transceiver (120) may transmit the aforementioned bands and allocations via a message to the secondary receiving transceiver (130).

The channel estimator (510) may cooperatively estimate a condition of a wireless channel used to transmit data between the secondary transmitting transceiver (120) and the secondary receiving transceiver (130). The channel estimator may generate weights for the beam formers based on received sounding packets, as will be discussed in greater detail with respect to FIGS. 7-8. The generated weights may be transmitted to the secondary transmitting transceiver (120).

The transceiver (520) may be a wireless transceiver that sends and receives wireless signals. The transceiver (520) may modulate the signals to encode or decode data. The transceiver (520) may include a beam former (530) and an antenna array (540). Each of the aforementioned components is described below.

The beam former (530) may modify the amplitude and/or phase of signals sent to antennas of the antenna array (540). Modifying the amplitude and/or phase of the signals may alter the radiation pattern of the antenna array (540) and thereby modify the channel characteristics between the secondary transmitting transceiver (120) and the secondary receiving transceiver (130). The amplitude and/or phase of the signals may be set by the channel estimator (510).

The antenna array (540) may be an array of antennas. Each of the antennas may receive signals from the beam former (530) and transmit the signals. The antennas may be, for example, dipole antennas, monopole antennas, patch antennas, or planar inverted F antennas. Other types of antennas may be used without departing from the invention.

Figure 2:
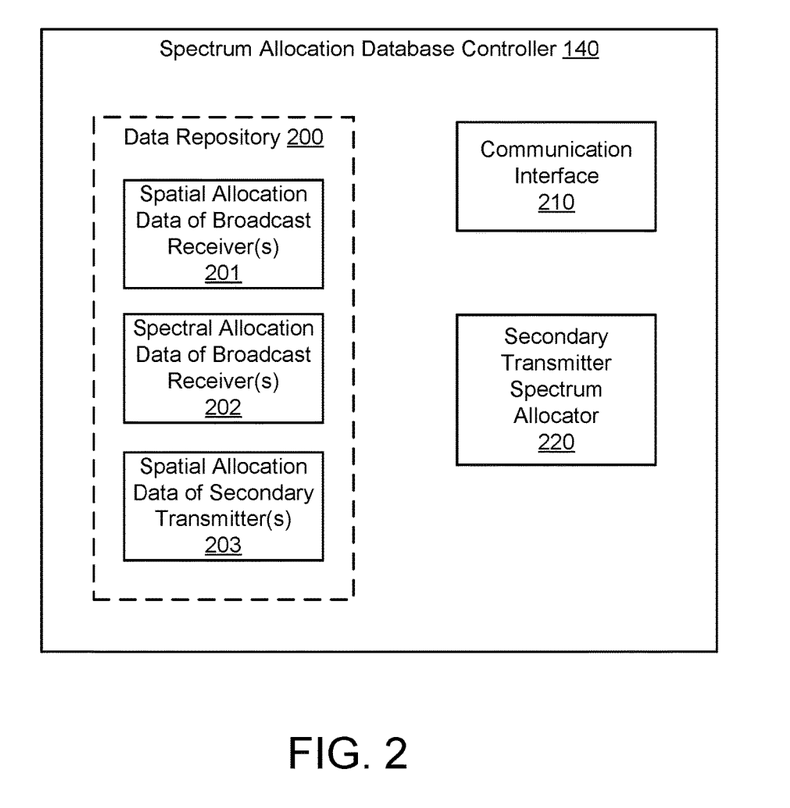
FIG. 2 shows a spectrum allocation database controller accordance with one or more embodiments of the invention.

Returning to FIG. 1, the network may include a spectrum allocation database controller (140). FIG. 2 shows a spectrum allocation database controller (140) in accordance with embodiments of the invention. The spectrum allocation database controller (140) may be a physical device that aggregates spatial and spectral data of all receivers operating within a spatial region and allocates spectral bands to transmitters that are operating within the spatial region. In one or more embodiments of the invention, the spectrum allocation database controller (140) is a network device, server, or router.

The spectrum allocation database controller (140) may include a processor, persistent memory, and transitory memory. Instructions stored on the persistent memory that, when executed by the secondary spectrum allocation database controller (140), provide the functionality shown in FIG. 9.

The spectrum allocation database controller (140) may include a data repository (200), a communication interface (210), and a secondary transmitter spectrum allocator (220). Each of the aforementioned components is described below.

The data repository (200) may be a computer readable storage medium (CRM). The CRM may be a hard drive, a network attached storage, a cloud storage, a solid state drive, persistent memory, transitory memory, or any other type of CRM for storage of data. The data repository (200) may store spatial allocation data of broadcast receiver(s) (201), spectral allocation data of broadcast receiver(s) (202), and spatial allocation data of secondary transmitter(s) (203). The spatial allocation data of broadcast receiver(s) (201) may specify the spatial location and/or broadcast area of each broadcast transmitter in a spatial area. The spectral allocation data of broadcast receiver(s) (202) may specify the spectral bands allocated to each active broadcast receiver in a spatial area. The spatial allocation data of secondary transmitter(s) (203) may specify the spatial location of each secondary transmitter (203) in a spatial area. As discussed with respect to FIGS. 3-5, each component of the network reports its spatial and/or spectral use to the spectrum allocation database controller (140). Thus, the data included in the data repository (200) may be obtained by the spectrum allocation database controller (140) by aggregating the data received from the other component s of the network.

The communication interface (210) may be a network interface that enables the spectrum allocation database controller (140) to communicate with the broadcast receiver (110), secondary transmitting transceiver (120), and/or the secondary receiving transceiver (130). The communication interface (210) may be, for example, a network adapter, an operable connection, or other type of communication link.

The secondary transmitter spectrum allocator (220) may allocate spectrum to transmitters within a spatial area. The secondary transmitter spectrum allocator (220) may allocate spectrum by determining a spatial location of a transmitter, comparing the spatial location of the transmitter to the spatial location of each broadcast receiver, and allocate spectrum to the transmitter by so that the transmitter will not interfere with any spectral band that any active broadcast receiver would receive.

While the methods and systems in FIGS. 1-5 have been used to illustrate embodiments of the invention, numerous other variations are possible without departing from the invention.

Figure 6:
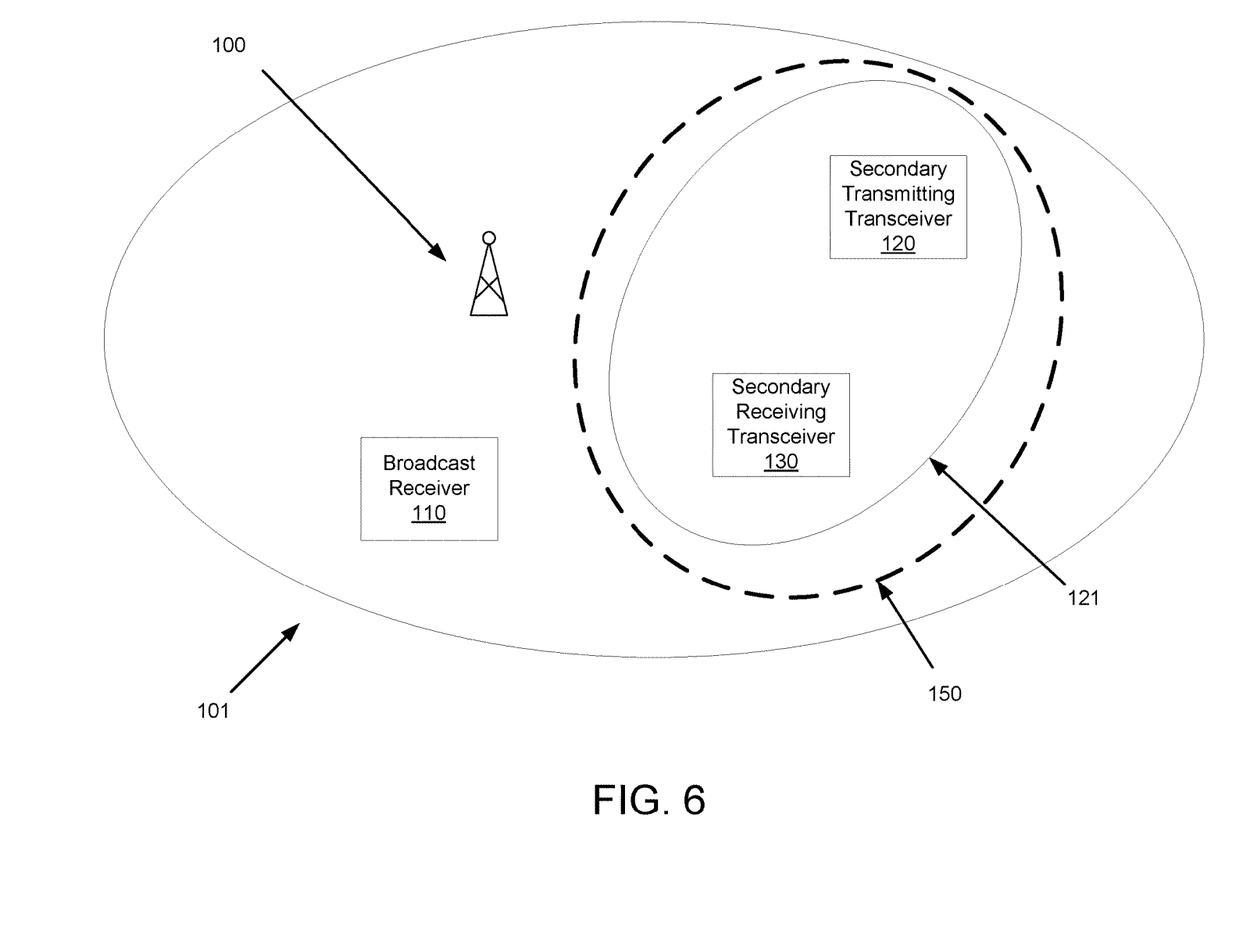
FIG. 6 shows a diagram of a second network in accordance with one or more embodiments of the invention.

FIG. 6 shows an alternative embodiment of a network in accordance with embodiments of the invention. In the network shown in FIG. 6, a broadcast receiver exclusion zone (150) is added to the network of FIG. 1 and the spectrum allocation database controller (140) is removed.

The broadcast receiver exclusion zone (150) is a spatial region where broadcast receivers (110) are not permitted. In FIG. 6, the secondary transmission area (121) in disposed within the broadcast receiver exclusion zone (150) and, therefore, the broadcast receiver (110) cannot be interfered with by transmissions from the secondary transmitting transceiver (120) or the secondary receiving transceiver (130). Thus, in FIG. 6, all spectral bands are allocated to the secondary transmitting transceiver (120) by default due to its spatial location.

Thus, in the following flow charts, the network shown in FIG. 1 may perform each of the methods shown in FIGS. 7-10 while the network shown in FIG. 6 may perform the methods shown in FIGS. 7-8.

FIG. 7 shows a flowchart in accordance with one or more embodiments of the invention. The method depicted in FIG. 7 may be used by a network to transmit data in accordance with one or more embodiments of the invention. One or more steps shown in FIG. 7 may be omitted, repeated, and/or performed in a different order among different embodiments.

In Step 700, a secondary transmitting transceiver obtains an allocated band in which a broadcast signal is present. The secondary transmitting transceiver may be a component of a network.

In one or more embodiments of the invention, the secondary transmitting transceiver may obtain the allocated band from a spectrum allocation database controller of the network. The secondary transmitting transceiver may obtain the allocated band by receiving a message from the spectrum allocation database controller that specifies the band. The spectrum allocation database controller may send the message in response to a message sent from the secondary transmitting transceiver to the spectrum allocation database controller requesting a band in which to transmit signals.

In one or more embodiments of the invention, the secondary transmitting transceiver may obtain the allocated band from a data repository. While FIG. 4 illustrates the data repository as being a component of the secondary transmitting transceiver, the data repository may be a different network element that is operably connected to the secondary transmitting transceiver. The secondary transmitting transceiver may obtain the allocated band by reading the allocated band from the data repository via the operable connection.

In Step 710, the secondary transmitting transceiver may generate a sounding packet. The sounding packet my have any predetermine form. In one or more embodiments of the invention, the sounding packet may conform to a training sequence.

In one or more embodiments of the invention, the sounding packet may be generated by a channel estimator of the secondary transmitting transceiver. The channel estimator may generate the packet based on a predetermined sequence and/or form.

In Step 720, the secondary transmitting transceiver sets a first beam weight for a first antenna to a first value and sets a second beam weight for a second antenna to a second value.

In one or more embodiments of the invention, the secondary transmitting transceiver includes a transceiver as shown in FIG. 4. The transceiver includes a beam former and an antenna array. The beam former may include circuitry capable of modulating the magnitude and/or phase of signals generated by the transceiver before they signals are transmitted via the antenna array. The first beam weight and second beam weight may be set to a first and second value by setting the modulation of the beam former based on the first and second value.

Returning to FIG. 7, in step 730, a first copy of the sounding packet is transmitted using the first beam weight and the second beam weight in the allocated band obtained in Step 700.

In one or more embodiments of the invention, the first copy is sent by modulating the signals generated by the transceiver using the beam former shown in FIG. 4 before the signals are radiated by the antenna array.

Returning to FIG. 7, in step 740, the first beam weight for the first antenna is set to a third value and the second beam weight of the second antenna is set to a fourth value.

In one or more embodiments of the invention, the first value is different from the third value and the second value is different from the fourth value.

In one or more embodiments of the invention, the first beam weight and second beam weight may be set to the third and fourth value, respectively, by setting the modulation of the beam former based on the third and fourth value as described with respect to FIG. 4.

Returning to FIG. 7, in step 750, a second copy of the sounding packet is transmitted using the first beam weight and the second beam weight in the allocated band obtained in Step 700. As noted with respect to step 740, the first and second beam weights have been changed to a third and fourth value, respectively, and thereby the first copy of the sounding packet and the second copy of the sounding packet are transmitted in steps 730 and 750, respectively, using different beams. By transmitting the first copy of the sounding packet and the second copy of the sounding packet using different beams multiple measurements of the channel may be made to remove interference caused by the broadcast signal that is present in the allocated band.

In step 760, a first correction beam weight and a second correction beam weight is obtained from an entity that received the copies of the sounding packet.

In one or more embodiments of the invention, a secondary receiving transceiver as shown in FIG. 5 received the copies of the sounding packet. As will be described with respect to FIG. 8, the secondary receiving transceiver determines the first correction beam weight and the second correction beam weight using the copies of the sounding packet.

In other embodiments of the invention, measurements of the first and second copy of the sounding packet may be transmitted rather than the first beam weight and the second beam weight. If measurements are sent, rather than the weights, the secondary transmitting transceiver may compute the beam weights using the methods described below with respect to FIG. 8.

In step 770, the secondary transmitting transceiver transmits data to the entity using the first correction beam weight and the second correction beam weight.

In one or more embodiments of the invention, the entity is the secondary receiving transceiver shown in FIG. 5.

In one or more embodiments of the invention, the secondary transmitting transceiver transmits the data using the first correction beam weight and the second correction beam weight by setting the modulation of the beam former based on the first correction beam weight and the second correction beam weight and thereby modifying the beam of the antenna pattern when the data is sent.

Thus, the method shown in FIG. 7 may enable a network having a first and second wireless link to simultaneously transmit data when the transmission areas of both wireless links overlap.

Numerous variations on the method shown in FIG. 7 are possible without departing from the invention.

In some embodiments of the invention, the allocated band may be divided into a plurality of sub-channels and the process shown in FIG. 7 may be repeated for each sub-channel.

In other embodiments of the invention, the allocated band may be divided into a plurality of sub-channels and the process shown in FIG. 7 may be repeated for a portion of the sub-channels. The portion of the sub-channels may be selected from the plurality of sub-channels based on a quality of the channel of each sub-channel. For example, only a portion of the sub-channels may receive substantial interference from a broadcast signal present in the allocated band. Only sub-channels that have a high bit error rate risk may be selected to be a part of the portion of the sub-channels.

FIG. 8 shows a flowchart in accordance with one or more embodiments of the invention. The method depicted in FIG. 8 may be used by a network to transmit data in accordance with one or more embodiments of the invention. One or more steps shown in FIG. 8 may be omitted, repeated, and/or performed in a different order among different embodiments.

In Step 800, a secondary receiving transceiver receives a first transmission from an entity. The first transmission includes a first copy of a sounding packet and the first transmission is received in a band where a broadcast signal is present. The secondary receiving transceiver may be a component of a network. The entity may be a secondary transmitting transceiver.

In Step 810, the secondary receiving transceiver receives a second transmission from the entity. The second transmission includes a second copy of the sounding packet and the second transmission is received in the band where the broadcast signal is present.

In Step 820, the secondary receiving transceiver determines a first correction beam weight and a second correction beam weight using the first transmission and the second transmission.

In one or more embodiments of the invention, the secondary receiving transceiver determines the first correction beam weight and the second correction beam weight based on a multiple transmission model of the channel between the secondary receiving transceiver and the secondary transmitting receiver. The multiple transmission model may include the broadcast signal, the first transmission, the second transmission, and the broadcast signal in the absence of the first or second transmission. In one or more embodiments of the invention, the multiple transmission model estimates channel conditions using the following equations:

$$Y_1 = H_{PU1} X_{PU} + (\alpha H_{SU11} + \beta H_{SU12}) X_{SU}$$

$$Y_2 = H_{PU2} X_{PU} + (\alpha H_{SU21} + \beta H_{SU22}) X_{SU}$$

$$H'_{SU} = (\alpha H_{SU11} + \beta H_{SU12}) - H'_{PU/SU-RX}(\alpha H_{SU21} + \beta H_{SU22})$$

where $\alpha = \cos(\theta)$ is the beamforming weight of the first antenna of secondary transmitting transceiver, $\beta = e^{j\Phi} \sin(\theta)$ is the beamforming weight of the second antenna of secondary transmitting transceiver (120), $X_{PU}$ is the broadcast signal, $X_{SU}$ is the signal transmitted by the secondary transmitting transceiver, $Y_1$ is the signal received from a first antenna of an antenna array of the transmitting receiving transceiver, $Y_2$ is the signal received from a second antenna of an antenna array of the transmitting receiving transceiver, $H_{SU11}$ is the channel state information from the first antenna of an antenna array of the secondary transmitting transceiver to the first antenna of an antenna array of the secondary receiving transceiver, $H_{SU12}$ is the channel state information from the second antenna of an antenna array of the secondary transmitting transceiver to the first antenna of an antenna array of the secondary receiving transceiver, $H_{SU21}$ is the channel state information from the first antenna of an antenna array of the secondary transmitting transceiver to the second antenna of an antenna array of the secondary receiving transceiver, and $H_{SU22}$ is the channel state information from the second antenna of an antenna array of the secondary transmitting transceiver to the second antenna of an antenna array of the secondary receiving transceiver.

The above equations may be solved by first measuring the channel state in the absence of the first or second transmission using the following equations:

$$Y_1 = H_{PU1} X_{PU}$$

$$Y_2 = H_{PU2} X_{PU},$$

$$H'_{PU/SU-RX} = Y_1/Y_2 = H_{PU1}/H_{PU2} = C_{Y1Y2} C^{-1}_{Y2Y2}$$

where $X_{PU}$ is the broadcast signal, $H_{PU1}$ is the Channel state information from broadcast transmitter to the first antenna of secondary receiving transceiver, $H_{PU2}$ is the Channel state information from broadcast transmitter to the second antenna of secondary receiving transceiver, $Y_1$ is the signal received from the first antenna of secondary receiving transceiver, $Y_2$ is the signal received from the second antenna of secondary receiving transceiver, $H'_{PU/SU-RX}$ is the broadcast signal cancellation coefficient, $C_{Y1Y2}$ is the covariance matrix of signal $Y_1$ and $Y_2$, and $C_{Y2Y2}$ is the covariance matrix of signal $Y_2$ and $Y_2$.

Using the broadcast signal cancellation coefficient, the broadcast signal that causes interference may then be canceled using the following equation:

$$Y = Y_1 - H'_{PU/SU-RX} Y_2$$

The result of the above equation may then be substituted into the multiple transmission model equations resulting in the equation:

$$H'_{SU} = (\alpha H_{SU11} + \beta H_{SU12}) - H'_{PU/SU-RX}(\alpha H_{SU21} + \beta H_{SU22}),$$

The above equation may be further reduced by defining:

$$H_1 = H_{SU11} - H'_{PU/SU-RX} H_{SU21},$$

$$H_2 = H_{SU21} - H_{PU/SU-RX} H_{SU22},$$

and reducing $Y = Y_1 - H'_{PU/SU-RX} Y_2 = H'_{SU} X_{SU}$ resulting in:

$$Y = H'_{SU} X_{SU} = (\alpha H_1 + \beta H_2) X_{SU}$$

The above system of equations is solved to maximize the magnitude of $H'_{SU}$ by varying $\theta$ and $\Phi$. The values of $\theta$ and $\Phi$ that maximized $H'_{SU}$ may be used to determine the first and second corrected beam weights directly by calculating $\alpha$ and $\beta$. The system may be solved by any method including, but not limited to, global solution methods, local solution methods, direct inversion methods, and stochastic methods.

In Step 830, the secondary receiving transceiver sends the first correction beam weight and the second correction beam weight to the entity.

In Step 840, the secondary receiving transceiver receives a third transmission from the entity. The third transmission includes data. The third transmission was sent using the first correction beam weight and the second correction beam weight. The third transmission was received in a band where the broadcast signal is present.

In Step 850, the secondary receiving transceiver decodes the data included in the third transmission using the first transmission and the second transmission.

In one or more embodiments of the invention, the secondary receiving transceiver decodes the data based on a multiple transmission model that removes interference caused by the broadcast signal. The multiple transmission model may include the broadcast signal, the first transmission, and the second transmission. In one or more embodiments of the invention, the multiple transmission model estimates channel conditions using the following equation:

$$Y = H'_{SU} X_{SU} = (\alpha H_1 + \beta H_2) X_{SU}$$

The above system of equation may be solved for $X_{SU}$ by any method without departing from the invention to remove the broadcast signal interference from the third transmission.

Once $X_{SU}$ is determined, the data may be decoded using any demodulation method.

Thus, the method shown in FIG. 8 may enable a network having a first and second wireless link to simultaneously transmit data when the transmission areas of both wireless links overlap.

Numerous variations on the method shown in FIG. 8 are possible without departing from the invention.

In some embodiments of the invention, the band in which the first, second, and/or third transmissions may be divided into a plurality of sub-channels and the process shown in FIG. 8 may be repeated for each sub-channel.

In other embodiments of the invention, the band in which the first, second, and/or third transmissions are transmitted may be divided into a plurality of sub-channels and the process shown in FIG. 8 may be repeated for a portion of the sub-channels. The portion of the sub-channels may be selected from the plurality of sub-channels based on a quality of the channel of each sub-channel. For example, only a portion of the sub-channels may receive substantial interference from a broadcast signal present in the band. Only sub-channels that have a high bit error rate risk may be selected to be a part of the portion of the sub-channels.

In other embodiments of the invention, the data may be decoded without performing steps 800-830. In such an embodiment, the data may be decoded by first measuring the channel state in the absence of the first or second transmission using the following equations:

$$Y_1 = H_{PU1} X_{PU}$$

$$Y_2 = H_{PU2} X_{PU},$$

$$H'_{PU/SU-RX} = Y_1/Y_2 = H_{PU1}/H_{PU2} = C_{Y1Y2} C^{-1}_{Y2Y2}$$

where $X_{PU}$ is the broadcast signal, $H_{PU1}$ is the Channel state information from broadcast transmitter to the first antenna of secondary receiving transceiver, $H_{PU2}$ is the Channel state information from broadcast transmitter to the second antenna of secondary receiving transceiver, $Y_1$ is the signal received from the first antenna of secondary receiving transceiver, $Y_2$ is the signal received from the second antenna of secondary receiving transceiver, $H'_{PU/SU-RX}$ is the broadcast signal cancellation coefficient, $C_{Y1Y2}$ is the covariance matrix of signal $Y_1$ and $Y_2$, and $C_{Y2Y2}$ is the covariance matrix of signal $Y_2$ and $Y_2$.

Using the broadcast signal cancellation coefficient, the broadcast signal that causes interference may then be canceled using the following equation:

$$Y = Y_1 - H'_{PU/SU-RX} Y_2$$

Figure 9:
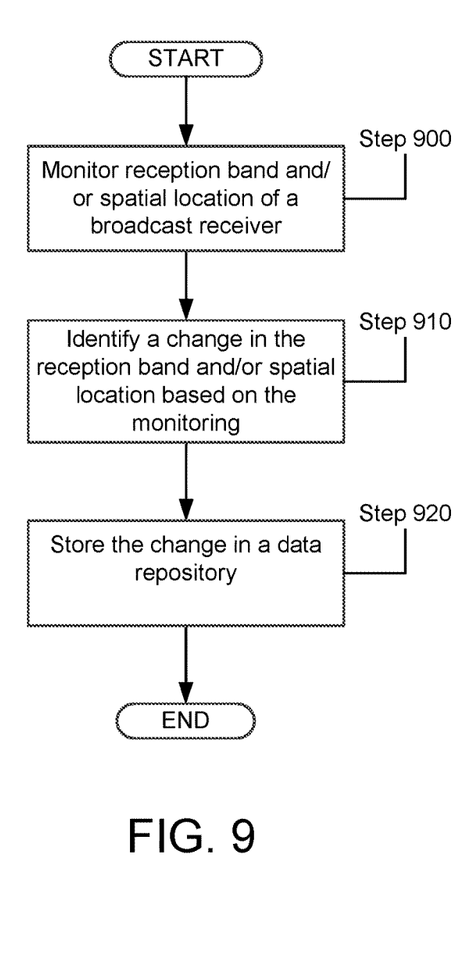
FIG. 9 shows a flowchart of a method of allocating bandwidth in accordance with one or more embodiments of the invention.

FIG. 9 shows a flowchart in accordance with one or more embodiments of the invention. The method depicted in FIG. 9 may be used by a network to allocate spectrum in accordance with one or more embodiments of the invention. One or more steps shown in FIG. 9 may be omitted, repeated, and/or performed in a different order among different embodiments.

In Step 900, a spectrum allocation database controller monitors an active reception band and/or a spatial location of a broadcast receiver. The spectrum allocation database controller may be connected to a network.

In one or more embodiments of the invention, the spectrum allocation database controller monitors the active reception band and/or a spatial location of the broadcast receiver by receiving messages from the broadcast receiver that specify the spatial location and/or active reception band of the broadcast receiver.

In Step 910, the spectrum allocation database controller identifies a change in the spatial location and/or active reception band of the broadcast receiver. The spectrum allocation database controller may identify the change by comparing a current location and/or current active reception band to a spatial location and/or active reception band stored in a data repository.

In Step 920, the spectrum allocation database controller stores the change in a data repository. In one or more embodiments of the invention, the data repository is a data repository as described with respect to FIG. 2.

Figure 10:
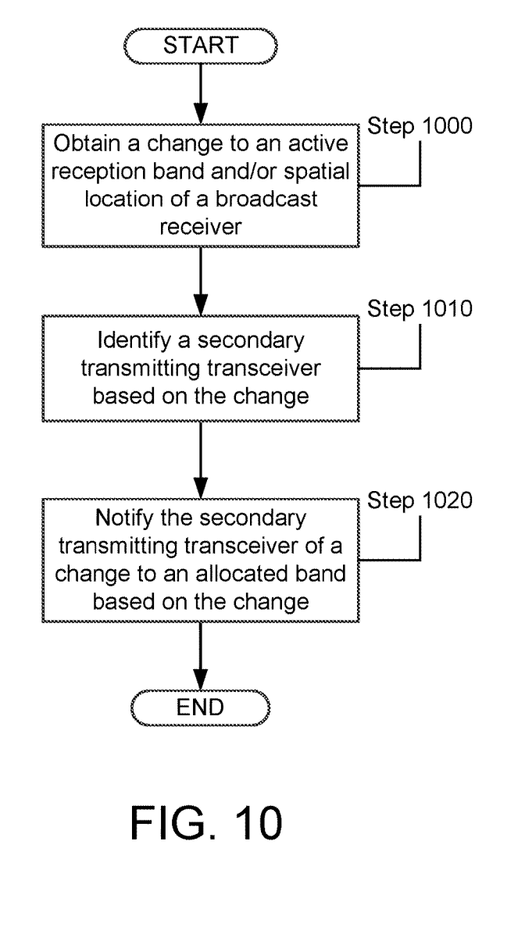
FIG. 10 shows a second flowchart of a method of allocating bandwidth in accordance with one or more embodiments of the invention.

FIG. 10 shows a flowchart in accordance with one or more embodiments of the invention. The method depicted in FIG. 10 may be used by a network to allocate spectrum in accordance with one or more embodiments of the invention. One or more steps shown in FIG. 10 may be omitted, repeated, and/or performed in a different order among different embodiments.

In Step 1000, a spectrum allocation database controller obtains a change to an active reception band and/or a spatial location of a broadcast receiver. The spectrum allocation database controller may be connected to a network.

In one or more embodiments of the invention, the spectrum allocation database controller obtains the change by receiving a message from a broadcast receiver that indicates the change. For example, the message may specify that the broadcast receiver has moved from a previous location and is reporting a new location.

In one or more embodiments of the invention, the spectrum allocation database controller obtains the change by reading a change based on data stored in a data repository. For example, the spectrum allocation database controller may include a data repository as described with respect to FIG. 2. Changes to data included in the data repository may indicate a change to a spatial location and/or active reception band of a broadcast receiver.

In Step 1010, the spectrum allocation database controller identifies a secondary transmitting transceiver based on the change.

In one or more embodiments of the invention, the spectrum allocation database controller identifies the secondary transceiver by comparing a spatial location and/or active reception channel specified by the change to a spatial location of secondary transmitting transceivers located within an area. The spectrum allocation database controller may compare the spatial location specified in the change to spatial location of secondary transmitting transceivers in an area near the spatial location specified in the change. If the spatial location specified in the change and the spatial location of any secondary transmitting transceiver are sufficiently close such that a receiver located at the spatial location specified by the change may receive interference caused by signals transmitted by a secondary transmitting transceiver, the secondary transmit transceivers that may cause interference are identified.

In Step 1020, the spectrum allocation database controller notifies the secondary transmitting transceiver identified in Step 1010 of a change to an allocated band. In one or more embodiments of the invention, the change may be a change to a spectrum of the allocated band. For example, the first spectrum may be reduced so that the secondary transmitting transceiver does not transmit in a band where an active broadcast receiver is operating. In one or more embodiments of the invention, the change may be a change to a maximum allow transmission power in a portion of the allocated band. For example, the maximum transmission power in a spectral region of an allocated band may be reduced so that signals transmitted by a secondary transmitting transceiver are reduced in power when the signals reach an active broadcast receiver and thereby does not interference with reception of broadcast signals by the active broadcast receiver.

In one or more embodiments of the invention, the spectrum allocation database controller reallocates transmission bands and/or transmission power in transmission bands to each secondary transmitting transceiver so that the secondary transmitting transceivers do not transmit signals in bands that interfere with broadcast receivers. In one or more embodiments of the invention, the spectrum allocation database controller may reallocate the transmission bands by deallocating any band of the secondary transmitting transceivers identified in Step 1010 that may interfere with broadcast receivers.

Thus, the methods illustrated in FIGS. 9 and 10 may enable a spectrum allocation database controller to catalog the spatial location and/or active reception band of each broadcast receiver and allocate transmission bands and/or transmission powers of allocated bands of secondary transmitting transceivers so that that the broadcast receivers do not receive interference from the secondary transmitting transceivers.

Embodiments of the invention may provide one or more of the following advantages: (i) embodiments of the invention may enable multiple wireless links to operate within the same spatial area, (ii) embodiments of the invention may improve data transmission rates of wireless links by reallocating transmission bands from a first wireless link to a second wireless link, and (iii) embodiments of the invention may enable the second wireless link to transmit data in a band where a broadcast signal is present.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A wireless device, comprising:
   a transceiver comprising:
      an antenna array that transmits to a second wireless device,
      a beam former that modifies a radiation pattern of the antenna array based on beam weights;
   a channel estimator that:
      generates a sounding packet;
      sends a plurality of copies of the sounding packet using the beam former and the antenna array to the second wireless device, wherein each copy of the plurality of copies of the sounding packet is sent using different beam weights;
      obtains, from the second wireless device, a first correction beam weight and a second correction beam weight, wherein the first correction beam weight and the second correction beam weight are determined by the second wireless device based on a multiple transmission model; and
      sends data to the second wireless device using the first correction beam weight and the second correction beam weight.

2. The wireless device of claim 1, wherein the first correction beam weight and the second correction beam weight are used to modify the radiation pattern of the antenna array when sending the data.

3. The wireless device of claim 1, further comprising:
   a data repository comprising:
      allocated bands in which the transceiver transmits; and
      sub-channel allocations that specify a plurality of channels, wherein each of the subs channels comprise a portion of the allocated bands.

4. The wireless device of claim 3, further comprising:
   a communication interface for communicating with a spectrum allocation database controller that specifies the allocated bands.

5. The wireless device of claim 4, further comprising:
   a spatial location identifier that notifies the spectrum allocation database controller of the spatial location of the wireless device.

6. A wireless device, comprising:
   a transceiver comprising:
      an antenna array that receives transmissions from a second wireless device;
   a channel estimator that:
      obtains a plurality of copies of a sounding packet from the second wireless device, wherein each copy of the sounding packet includes interference from a broadcast transmission;
      determines a first correction beam weight and a second correction beam weight using the plurality of copies of the sounding packet, interference of broadcasting signals, and multiple transmission model;
      sends, to the second wireless device, the first correction beam weight and the second correction beam weight;
      obtains, from the second wireless device, a data transmission including interference from the broadcast transmission, wherein the data transmission is sent by the second wireless device using the first correction beam weight and the second correction beam weight;
      removes the interference from the data transmission based on a multiple transmission model; and
      decodes the data from the data transmission after removing the interference.

7. The wireless device of claim 6, wherein the first correction beam weight and the second correction beam weight are obtained by estimating a channel condition between the wireless device and the second wireless device and an interference channel during a transmission of each of the copies of the sounding packet.

8. The wireless device of claim 6, wherein the first correction beam weight and the second correction beam weight are obtained by estimating a channel condition between the wireless device and the second wireless device during a period of time when the second wireless device is not transmitting.

9. The wireless device of claim 8, wherein the interference from the broadcast transmission is present during the period of time.

10. The wireless device of claim 6, wherein each copy of the plurality of copies of the sounding packet was sent by the second wireless device using a different radiation pattern.

11. A method for wireless data transmission, comprising:
generating, by a first wireless device, a sounding packet;
sending, by the first wireless device, a plurality of copies of the sounding packet using a beam former and an antenna array to a second wireless device, wherein each copy of the plurality of copies of the sounding packet is sent using different beam weights;
obtaining, by the first wireless device, a first correction beam weight and a second correction beam weight from the second wireless device, wherein the first correction beam weight and the second correction beam weight are determined by the second wireless device based on a multiple transmission model; and
sending, by the first wireless device, data to the second wireless device using the first correction beam weight and the second correction beam weight.

12. The method of claim 11, further comprising:
suspending, by the first wireless device, transmission using the antenna array during a period of time;
receiving, by the first wireless device, a confirmation from the second wireless device that a channel between the first wireless device and the second wireless device and an interference channel were characterized during the period of time.

13. The method of claim 11, wherein the data is sent in a band where a broadcast signal that interferes with a transmission of the data is present.

14. The method of claim 13, wherein the broadcast signal is a television transmission.

15. The method of claim 11, wherein using different beam weights modifies a radiation pattern of an antenna array to have a different shape when each copy of the sounding packet is sent.

16. A method for wireless data transmission, comprising:
obtaining, by a first wireless device, a plurality of copies of a sounding packet from a second wireless device, wherein each copy of the sounding packet includes interference from a broadcast transmission;
determining, by the first wireless device, a first correction beam weight and a second correction beam weight using the plurality of copies of the sounding packet;
sending, by the first wireless device, the first correction beam weight and the second correction beam weight to the second wireless device;
obtaining, by the first wireless device, a data transmission comprising interference from the broadcast transmission from the second wireless device, wherein the data transmission was sent by the second wireless device using the first correction beam weight and the second correction beam weight;
removing, by the first wireless device, the interference from the data transmission based on a multiple transmission model; and
decoding, by the first wireless device, the data from the data transmission after removing the interference.

17. The method of claim 16, obtaining the first correction beam weight and the second correction beam weight comprises:
estimating a channel condition between the first wireless device and the second wireless device and an interference channel during a transmission of each of the copies of the sounding packet.

18. The method of claim 16, obtaining the first correction beam weight and the second correction beam weight comprises:
estimating a channel condition between the first wireless device and the second wireless device during a period of time when the second wireless device is not transmitting.

19. The method of claim 18, wherein the interference from the broadcast transmission is present during the period of time.

20. The method of claim 16, wherein each copy of the plurality of copies of the sounding packet was sent by the second wireless device using a different radiation pattern.

* * * * *